(12) United States Patent
Leschke et al.

(10) Patent No.: US 11,391,752 B2
(45) Date of Patent: Jul. 19, 2022

(54) METHOD AND DEVICE FOR EARLY ACCIDENT DETECTION

(71) Applicant: VOLKSWAGEN AG, Wolfsburg (DE)

(72) Inventors: Andre Leschke, Wolfsburg (DE); Florian Weinert, Osterwieck (DE)

(73) Assignee: Volkswagen AG

( * ) Notice: Subject to any disclaimer, the term of this patent is extended or adjusted under 35 U.S.C. 154(b) by 572 days.

(21) Appl. No.: 16/447,250

(22) Filed: Jun. 20, 2019

(65) Prior Publication Data

US 2020/0003798 A1 Jan. 2, 2020

(30) Foreign Application Priority Data

Jun. 29, 2018 (DE) .................. 10 2018 210 734.3
Aug. 29, 2018 (DE) .................. 10 2018 214 674.8

(51) Int. Cl.
*G01P 15/00* (2006.01)
*G01P 15/08* (2006.01)
(Continued)

(52) U.S. Cl.
CPC ............ *G01P 15/0891* (2013.01); *G06N 3/08* (2013.01); *G07C 5/08* (2013.01)

(58) Field of Classification Search
CPC .......... G01P 15/0891; G06N 3/08; G07C 5/08
See application file for complete search history.

(56) References Cited

U.S. PATENT DOCUMENTS 6,181,998 B1  1/2001  Kanameda et al.
6,540,255 B1 * 1/2003  Blank .................. B60R 21/32
                                                280/735

(Continued)

FOREIGN PATENT DOCUMENTS

| DE | 19740021 A1 | 2/1999 |
| DE | 10141886 A1 | 3/2003 |
| DE | 10323483 A1 | 12/2004 |
| DE | 10348999 A1 | 5/2005 |
| DE | 102006014055 A1 | 10/2006 |
| DE | 60306459 T2 | 11/2006 |

(Continued)

OTHER PUBLICATIONS

Office Action for Chinese Patent Application No. 201910573362.2; dated Aug. 16, 2021.

*Primary Examiner* — Elaine Gort
*Assistant Examiner* — Brittany Renee Peko
(74) *Attorney, Agent, or Firm* — Barnes & Thornburg, LLP

(57) ABSTRACT

A method for an early accident detection in transportation vehicles that includes recording the local acceleration at different distributed locations in a transportation vehicle using acceleration sensors installed at different locations; ascertaining local effect information for the different locations based on the measured accelerations; jointly evaluating the effect information for the different locations and deriving accident information, and outputting the accident information. The method includes an apparatus having acceleration sensors installed at different distributed installation locations in a transportation vehicle for recording the local acceleration at the respective installation location, one or more processing circuits for ascertaining in each case local effect information for the different installation locations based on the respectively measured local acceleration, and an evaluation device for jointly evaluating the effect information for the different installation locations and deriving accident information and outputting the accident information.

16 Claims, 8 Drawing Sheets

(51) Int. Cl.
*G06N 3/08* (2006.01)
*G07C 5/08* (2006.01)

(56) References Cited

U.S. PATENT DOCUMENTS

| | | | |
|---|---|---|---|
| 10,186,090 B2 | 1/2019 | Lang et al. | |
| 2005/0046584 A1* | 3/2005 | Breed | G08C 19/00 |
| | | | 340/825.72 |
| 2011/0022275 A1 | 1/2011 | Oosaki | |
| 2015/0317844 A1* | 11/2015 | Choi | G07C 5/008 |
| 2018/0053401 A1* | 1/2018 | Martin | G08B 29/188 |
| 2018/0114377 A1* | 4/2018 | Dyeyev | G07C 5/008 |
| 2019/0077353 A1* | 3/2019 | Lopez | B60R 21/0132 |
| 2019/0101914 A1* | 4/2019 | Coleman | G05D 1/0055 |
| 2019/0266629 A1* | 8/2019 | Bax | G06Q 30/0215 |
| 2019/0303718 A1* | 10/2019 | Tanigawa | G06K 9/6256 |

FOREIGN PATENT DOCUMENTS

| | | |
|---|---|---|
| DE | 102006027771 A1 | 12/2007 |
| DE | 102016203000 A1 | 8/2017 |
| GN | 105307903 A | 2/2016 |
| JP | H11263188 A | 9/1999 |

* cited by examiner

| j | $t_1$ | $t_2$ | $t_3$ | $t_4$ | $t_5$ | $t_6$ |
|---|---|---|---|---|---|---|
| 1 | 0 | 0 | 0 | 1 | (1) | |
| 2 | 1 | (1) | (1) | (1) | (1) | (1) |
| 3 | 1 | (1) | (1) | (1) | (1) | (1) |
| 4 | 0 | 1 | (1) | (1) | (1) | (1) |
| 5 | 0 | 0 | 0 | 1 | (1) | (1) |
| 6 | 0 | 0 | 0 | 0 | 1 | (1) |
| 7 | 0 | 0 | 1 | (1) | (1) | (1) |
| 8 | 0 | 0 | 0 | 0 | 0 | 1 |
| GUEM $(t_j)$ | 2 | 5 | 9 | 15 | 22 | 30 |
| $IUEM_1(t_j)$ | 0 | 0 | 0 | 1 | 2 | 3 |
| $IUEM_2(t_j)$ | 1 | 2 | 3 | 4 | 5 | 6 |
| $IUEM_3(t_j)$ | 1 | 2 | 3 | 4 | 5 | 6 |
| $IUEM_4(t_j)$ | 0 | 1 | 2 | 3 | 4 | 5 |
| $IUEM_5(t_j)$ | 0 | 0 | 0 | 1 | 2 | 3 |
| $IUEM_6(t_j)$ | 0 | 0 | 0 | 0 | 1 | 2 |
| $IUEM_7(t_j)$ | 0 | 0 | 1 | 2 | 3 | 4 |
| $IUEM_8(t_j)$ | 0 | 0 | 0 | 0 | 0 | 1 |

FIG. 7

METHOD AND DEVICE FOR EARLY ACCIDENT DETECTION

PRIORITY CLAIM

This patent application claims priority to German Patent Application Nos. 10 2018 210 734.3, filed 29 Jun. 2018, and 10 2018 214 674.8, filed 29 Aug. 2018, the disclosures of which are incorporated herein by reference in their entireties.

SUMMARY

Illustrative embodiments relate to early accident detection in transportation vehicles. This is necessary to be able to trigger active safety systems, such as, for example, airbags, belt tensioners, or the like, in optimum state in the event of an accident.

BRIEF DESCRIPTION OF THE DRAWINGS

The disclosed embodiments are explained more specifically below with reference to the figures, in which:

FIG. 7 shows a schematic depiction of the effect information recorded in different recording intervals and shows a derivation of the overall accident occurrence measure and of the local accident occurrence measures.

DETAILED DESCRIPTION

Figure 1:
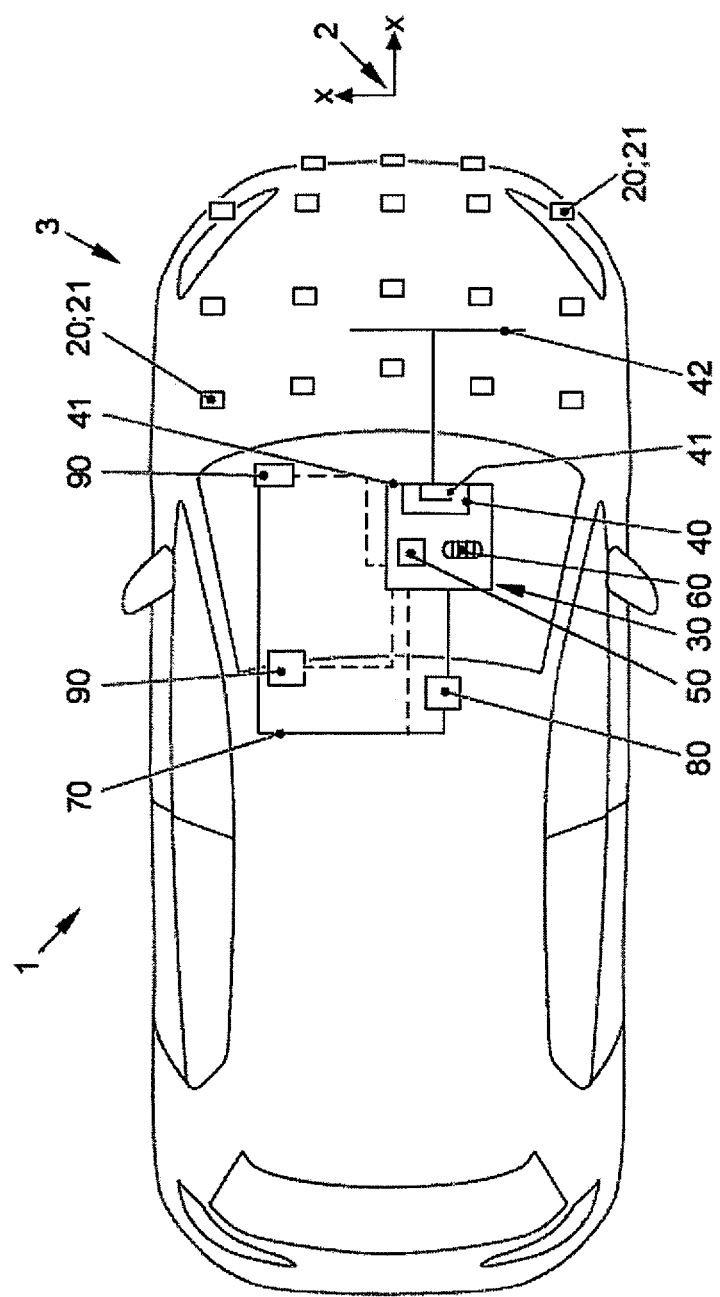
FIG. 1 shows a schematic plan view of a transportation vehicle having an apparatus for early accident detection.

The prior art discloses systems that use an acceleration sensor to evaluate a time characteristic of a speed reduction and, as a result, attempt to distinguish between different accident scenarios, also called load cases, to ascertain an optimum time for triggering an airbag and/or a belt tensioners or other safety systems. Such a system is described in DE 101 41 886 A1, for example, in which determination of a trigger time for restraining methods or mechanisms in a transportation vehicle is achieved by virtue of there being provision for the formation of two time windows for the speed reduction and the slope of the speed reduction in the respective windows and the position of the time windows being determined to achieve accurate determination of the trigger time therefrom in conjunction with a collision time and collision speed, which are ascertained by a precrash sensor system.

The different accident or event scenarios can be distinguished between in different load cases for the transportation vehicle. In this context, load cases or event scenarios exist in which, although a collision with an obstacle takes place, the damage arising does not lead to a risk for occupants and therefore triggering of restraining methods and mechanisms is not necessary. In these situations, it is absolutely desirable to avoid triggering the restraining methods and mechanisms. On the other hand, in other load cases and accident scenarios, it is necessary to trigger the restraining methods and mechanisms in timely manner to keep the accident consequences for occupants to a minimum. In both types of collision scenarios, heavy strains and decelerations on the transportation vehicle can briefly occur. It is therefore necessary for the different load cases to be able to be detected and distinguished between as early and explicitly as possible.

Disclosed embodiments provide a method and an apparatus that allow effect scenarios to be distinguished between in as early and differentiated a manner as possible.

Disclosed embodiments provide a method and an apparatus.

The disclosed embodiments are based on the concept of installing a multiplicity of sensors, in particular, acceleration sensors, on subassemblies in the transportation vehicle. If an accident occurs, deformations and destruction of subassemblies arise on the transportation vehicle during the collision. As a result, the decelerations measured by the individual sensors installed in the transportation vehicle in distributed state are different over the time profile of an accident. In the event of a front-on collision at 0° with respect to an obstacle, for example, the acceleration sensors installed furthest toward the front, which are installed in a manner distributed on a bumper, for example, all experience a very heavy deceleration at the beginning of the accident, whereas sensors installed further on the inside measure only a relatively small deceleration at the beginning of the course of the accident. If, on the other hand, a collision between the front right-hand transportation vehicle side and a deformable object in an offset arrangement takes place, then sensors installed at the front right on the bumper experience a very much heavier acceleration than sensors installed at the front left on the bumper and further inside the transportation vehicle. On the basis of the accelerations measured locally on subassemblies, it is therefore possible to ascertain local effect information for each sensor and the ascertained effect information for the sensors can be used to derive and output accident information. An apparatus for early detection of an accident therefore comprises a multiplicity of sensors installed at different, distributed locations in the transportation vehicle for recording the local acceleration at the respective installation location, one or more processing circuits for ascertaining in each case local effect information for different locations on the basis of the respectively measured local acceleration and an evaluation device for jointly evaluating the effect information for the different locations and deriving accident information, and outputting the accident information.

The accident information can comprise intervention information causing automatic intervention of safety systems or else can comprise an identification of a detected accident or event scenario. The intervention information can also comprise times for triggering restraining methods and mechanisms, etc.

Since the measured acceleration values that arise from sensors in the event of an accident vary greatly, a disclosed embodiment has provision for ascertainment of the local effect information being achieved in each case by virtue of the acceleration measured at the respective sensor being integrated over ascertainment periods to ascertain speed change values for the applicable location, and the effect information for a location being derived on the basis of one or more speed change value(s) obtained for the location.

There is, therefore, provision for the one or more processing circuits each to comprise an integrator to iteratively integrate the acceleration measured at the respective sensor over ascertainment periods to ascertain speed change values for the applicable location, and for the processing circuits to be designed to derive the effect information for a location on the basis of one or more speed change values obtained for the location. The speed change values ascertained reproduce reliable information about the speed change actually taking place at a local location, in particular, a speed reduction.

Effect information can be ascertained for example, by virtue of an ascertained speed change being compared with an effect threshold value. This effect threshold value can be uniformly stipulated for all sensors that are installed. This affords the benefit that sensors can be produced in large numbers and can be interchanged with one another as desired when the transportation vehicle is being produced or repaired. Only one spare sensor is needed. Other disclosed embodiments can provide for the effect threshold value to be prescribed individually for the installation location. As a result, it is possible to stipulate how great a speed reduction needs to be at the applicable installation location for an effect to be detected as having taken place.

Other disclosed embodiments provide for an effect to be deemed to have been detected at an installation location if the speed change ascertained on the basis of the integration of the acceleration value has changed at least by an effect threshold value. In this case too, the effect threshold value for the change in the speed change value can be uniformly stipulated for all sensors or, in other disclosed embodiments, can be stipulated on the basis of installation location.

It has been found that evaluation and detection of the accident scenario to which a current effect event corresponds most readily only requires binary information regarding whether or not an effect has taken place at the installation location to be evaluated as effect information. There is, therefore, provision for the effect information for each of the sensors installed at the different locations to be binary information and for the applicable information contents "effect occurring" and "no effect occurring" to be accordingly represented by 1 and 0 or vice versa. As already indicated above, the effect information can be derived for each location on the basis of the recorded local acceleration. In this case, the binary information is set to the information content "effect occurring" if the local effect at the installation location has been established on the basis of the local acceleration. This can take place, for example, if a quantity derived from the local acceleration satisfies a prescribed condition. Normally, this condition will be that a speed change that has occurred, which has been ascertained on the basis of the integrated acceleration signal, has exceeded a prescribed value or a prescribed change. An essential feature of disclosed embodiments in which the effect information is binary information is that it is sufficient to establish for the individual installation locations that an effect has occurred, and to be able to ascertain this over the course of time in an effect event. The apparatuses according to this disclosed embodiment may be designed such that the one or more processing circuit(s) are each designed to provide the effect information as binary information, with the information content "effect occurring" and "no effect occurring" accordingly being represented by 1 and 0, or vice versa.

It has been found that a simple and robust type of ascertainment of whether a current effect event represents an accident requiring active intervention, for example, by triggering restraining methods and mechanisms, can be ascertained, for example, by virtue of an overall accident occurrence measure being formed for which all effect information is integrated over time. This simple measure is sufficient to distinguish event scenarios in which intervention and triggering of restraining methods and mechanisms is necessary from event scenarios in which, although an effect is taking place on the transportation vehicle, triggering of restraining methods and mechanisms, for example, is not desirable.

For this evaluation, it is beneficial if each sensor for which the local effect has ever satisfied the prescribed condition during an effect event, so that the effect information has assumed the information content "effect occurring", retains this value for all subsequent times. Technically, this can be realized in a processing device by virtue of a sample-and-hold circuit being realized therein. Additionally or alternatively, this can also be implemented in the integration logic or, in the event of discrete integration over periods of time, in summation logic. It is subsequently assumed that an effect that has taken place is represented by the binary value 1. In this case, the overall accident occurrence measure is a quantity that rises monotonously over the course of time. If, on the other hand, the binary value "effect occurring" would be represented by a 0, then effect information from sensors for which an effect has not taken place would allow the overall accident occurrence measure to rise monotonously. In such a case, the usable statement is by the difference between the maximum possible value of the integration of the effect information over time, i.e., assuming that an effect has not taken place for any of the sensors, and the value of the integration over the actually ascertained effect information. Such a calculation is more complicated and the immediate integration result is less intuitive, which means that it is beneficial to represent the effect information "effect occurring" by use of the binary value 1.

So as not to have to provide every sensor individually with an information line so that the effect information can be recorded in parallel at any time, there may be provision for the individual information content ascertained by the processing devices assigned to the sensors to be iteratively read or requested. The overall accident occurrence measure is then optionally ascertained iteratively at evaluation times chosen such that in each case complete information about the effect information of all sensors is available, which is recorded in a preceding recording interval. A disclosed method therefore provides for derivation of the accident information to be achieved by virtue of an overall accident occurrence measure being ascertained iteratively at evaluation times by virtue of all effect information of the sensors being combined iteratively in recording intervals and a total of the values of all sensors representing the effect information over all past recording intervals for a current effect event being formed, wherein for each sensor whose effect information has ever assumed the information content "effect occurring" 1 during the current effect event, the effect information used for this sensor for this and all subsequent recording interval(s) is the value "effect occurring" 1, and the accident information output is intervention information as soon as the overall accident occurrence measure has exceeded an intervention threshold value at an evaluation time. The applicable apparatus has an evaluation device that is accordingly designed to derive the accident information from the overall accident occurrence measure. In this case, it is assumed that a time interval between the evaluation times is always of the same length. If this is not the case, the effect information values recorded between two sampling times need to be weighted with the period of time between these sampling times.

If a multiplicity of different accident scenarios are evaluated and considered, either experimentally or by simulations, concerning at what times which of the multiplicity of sensors experience an inherent effect in the different accident scenarios that leads to the respective effect information for the sensors assuming that the information content "effect occurring", it is established that the overall accident occurrence measures plotted against time represent monotonously rising curves. If the accident scenarios for which triggering of safety measures is necessary and those for which no intervention is necessary are now considered, it turns out that they are separable from one another by an intervention threshold function in a graphical representation such that the curves representing the time characteristic of the overall accident occurrence measure for event scenarios requiring intervention intersect the intervention threshold function, whereas the curves corresponding to event scenarios requiring no intervention do not intersect the intervention threshold function at least in the period of time relevant to a decision regarding whether an intervention needs to take place. Within a critical period of time, within which a decision needs to be taken about use of active measures to minimize accidents in the transportation vehicle, in particular, in a period of time in which a decision needs to be made as to whether and when restraining methods and mechanisms are triggered, it is found that the different curves of the overall accident occurrence measure plotted against time can be separated by a straight line of constant gradient, in the simplest form with a straight line with the gradient 0 in the manner cited. The curves of the overall accident occurrence measure that require intervention intersect this intervention threshold function. Furthermore, it is found that the overall accident occurrence measure curves for effect events for which early triggering of restraining methods and mechanisms is necessary intersect this intervention threshold function at an earlier time than those overall accident occurrence measure curves that correspond to effect events requiring intervention at a later time.

As a result of the effect information being considered only at particular evaluation times, the times for the occurrence of the information content "effect occurring" are each discretized for these sampling times. Although this leads to a simplification and loss of information, a reliable evaluation is nevertheless possible.

The event period is regarded as the period of time in which a current effect scenario takes place.

A more detailed evaluation can provide for derivation of the accident information to be achieved by virtue of a local accident occurrence measure being ascertained iteratively at evaluation times for each of the sensors by virtue of the values that represent the effect information for the respective sensor for all previous recording intervals for a current effect event being combined in a total for the sensor, wherein the effect information used for all recording intervals for the current effect event that follow the recording interval in which the effect information first assumes the value (1) corresponding to the information content "effect occurring" in the current effect event is the value 1 for the effect information "effect occurring", and derivation of the accident information is achieved by virtue of the local accident occurrence measures being regarded as variables that represent a current effect event and the current effect event being associated with an effect scenario or with a cluster of effect scenarios using a classification operation, and the accident information output being intervention information if the current effect event represented by the local accident occurrence measures is associated with an effect scenario or a cluster of effect scenarios requiring automatic intervention measures, also referred to as safety measures to be triggered, in particular, restraining methods and mechanisms to be triggered. The intervention information signals that intervention, for example, triggering of restraining methods and mechanisms, is required.

If a local accident occurrence measure is formed for each of the sensors by virtue of the effect information for the sensor being integrated over time, on the proviso that the effect information retains the information content "effect occurring" during an effect event as soon as the effect information has ever assumed this information content "effect occurring", a local accident occurrence measure is obtained for each sensor. This local accident occurrence measure can be determined in each case for different evaluation time. All of these local accident occurrence measures and the alteration thereof over time in an effect event characterize the individual event scenarios. At one evaluation time, the effect event is therefore described by the local accident occurrence measures. Every local accident occurrence measure in this case represents a quantity of the effect event at the respective sampling time. It has been found that event scenarios can be grouped into clusters by a multivariate cluster analysis, the clusters each comprising event scenarios that are similar or identical to one another in respect of the required intervention and intervention time. It is possible to separate event scenarios requiring intervention shortly after the beginning of the effect event from those event scenarios that require intervention at a later time and, furthermore, to reliably separate these clusters of event scenarios from those clusters of event scenarios that require no intervention at all. It has been found that this separation is possible in each case at the times that corresponds to the time or is before the time at which such intervention is necessary for these event scenarios. Over time, it is therefore always reliably possible to decide whether or not intervention is necessary. At the different evaluation times representing a different period since the beginning of the event, it is therefore possible in each case to perform a classification that possibly allows only a classification into "intervention necessary" or "intervention not necessary" at very short times, but also allows individual association with individual prescribed event scenarios at later times.

The associating of a current effect event represented by the overall accident occurrence measure or current effect event represented by the local accident occurrence measures with event scenarios is effected by a multivariate cluster analysis in at least one disclosed embodiment.

For each evaluation time, it is therefore possible for a multivariate cluster analysis and/or classification of an effect event in comparison with previously determined clusters of effect scenarios to be performed.

In another disclosed embodiment, the associating of a current effect event represented by the overall accident occurrence measure or current effect event represented by the local accident occurrence measures with event scenarios is effected, possibly additionally, by an artificial neural network trained in effect scenarios requiring intervention, for example, automatic intervention measures, and effect scenarios requiring no intervention, in particular, no automatic intervention measures.

To minimize a number of required signal lines in the transportation vehicle, it is beneficial that the effect information is transmitted at least from some of the sensors to the evaluation device wirelessly.

In a disclosed embodiment, there is provision for the evaluation device to comprise a communication device, such as an RFID reader, and for the sensors, in each case with one of the multiple processing circuits and an RFID communication and power supply device, to be an RFID sensor module. The RFID sensor modules are supplied with power by electromagnetic radiation that the communication device of the evaluation device, such as an RFID reader sends. The individual RFID sensor modules operate their acceleration sensors and a processing device, such as a processing circuit, that integrates the acceleration signals over the ascertainment periods. If the ascertainment periods are shorter than the recording periods in which the individual RFID sensor modules transmit their information to the evaluation device, then the individual processing circuits have a sample-and-hold circuit for the value of the effect information that is derived from the integrated speed change value, so that the information content of the effect information "effect occurring" that is derived in an ascertainment period remains stored in the RFID sensor module until this effect information is transmitted to the evaluation device.

The term sensor module is used for those units that comprise not only an acceleration sensor but also further functional units, such as, for example, a processing device and/or an RFID communication and power supply device. Even if a sensor module comprises an RFID communication and power supply device for an RFID communication, frequently only the term sensor module is used in this case for short. It is evident to a person skilled in the art from the context whether a sensor module is also an RFID sensor module. This is the case whenever the sensor module has an RFID communication and power supply device.

Depending on the configuration of the overall apparatus, there may be provision for the sample and hold circuits in the individual processing circuits associated with the sensors either to store this effect information over the time of the subsequent transmission of the effect information or to be reset upon transmission of the effect information.

The apparatus may be designed so as to request iteratively in recording intervals the effect information of all sensor modules, but at least of those whose transmitted effect information had not already assumed the information content "effect occurring" in a preceding recording interval.

If the overall accident occurrence measure and/or the local accident occurrence measures are ascertained at evaluation times at the same intervals, it is only necessary to buffer-store the ascertained local accident occurrence measures and the overall accident occurrence measure. By adding the values of the newly ascertained effect information to the buffer-stored values, the overall accident occurrence measure or the local accident occurrence measures is/are obtained for the current evaluation time.

A beginning of an effect event can be derived on the basis of the recorded effect information by virtue of a change of information content of the effect information for a prescribed number of sensors being regarded as the beginning of an event.

Figure 2:
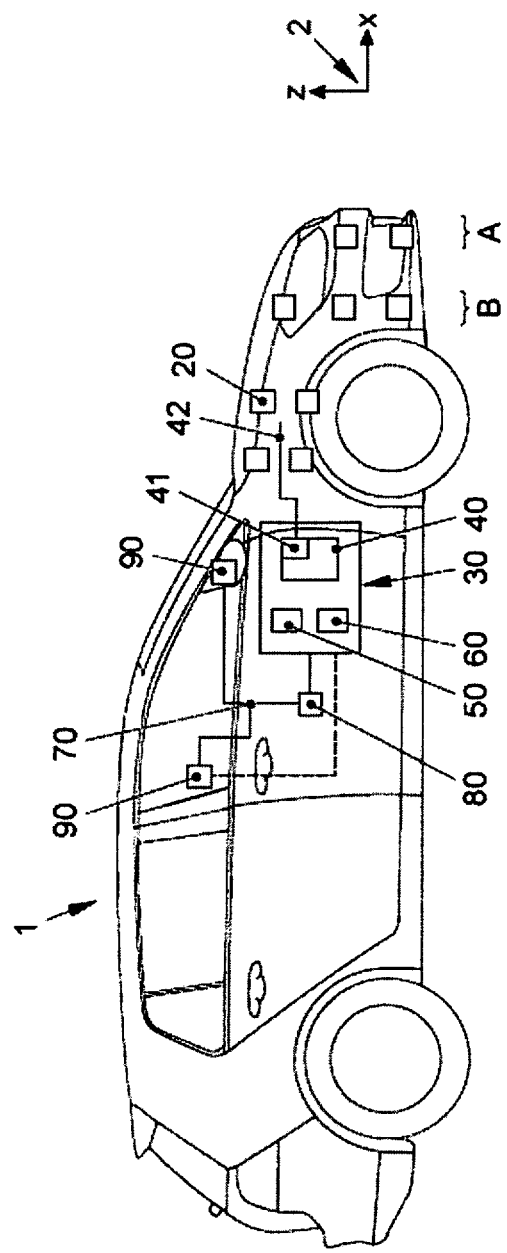
FIG. 2 shows a schematic side view of the transportation vehicle shown in FIG. 1.

FIG. 1 schematically depicts a transportation vehicle 1 in a plan view. FIG. 2 depicts the transportation vehicle 1 in a side view. Identical technical features are denoted by the same reference signs throughout the figures. The transportation vehicle has a coordinate system 2 linked to it, the x-direction of which is in horizontal alignment, coincides with a center axis of the transportation vehicle 1 and is oriented in the forward direction of travel. The y-direction, just like the x-direction, is oriented horizontally from the center of the transportation vehicle to the left-hand half of the transportation vehicle. The z-axis points perpendicularly upward. The transportation vehicle 1 has an apparatus 10 for early accident detection. The apparatus 10 for early accident detection comprises a multiplicity of sensor modules 20 installed at different locations in the transportation vehicle, in this case in the front part 3 of the transportation vehicle 1. These each comprise an acceleration sensor 21. The sensor modules 20 are linked to an evaluation device 30 for information purposes. Optionally, all the sensor modules 20 are RFID sensor modules.

The disclosure assumes that an effect event, for example, an accident, results in the acceleration sensors 21 of the sensor modules 20, which acceleration sensors are installed on different subassemblies of the transportation vehicle, each measuring a local acceleration. These accelerations are different for the individual acceleration sensors 21 at different times during the course of the accident.

Figure 3A:
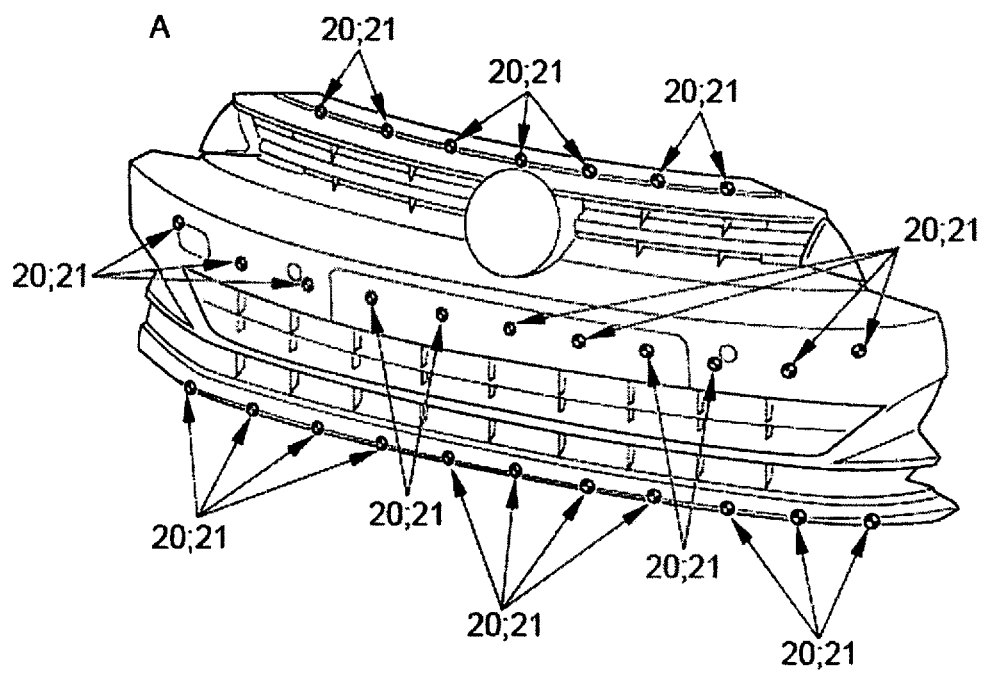
FIGS. 3a and 3b show schematic views of different levels in which an arrangement of sensor modules is depicted.
Figure 3B:
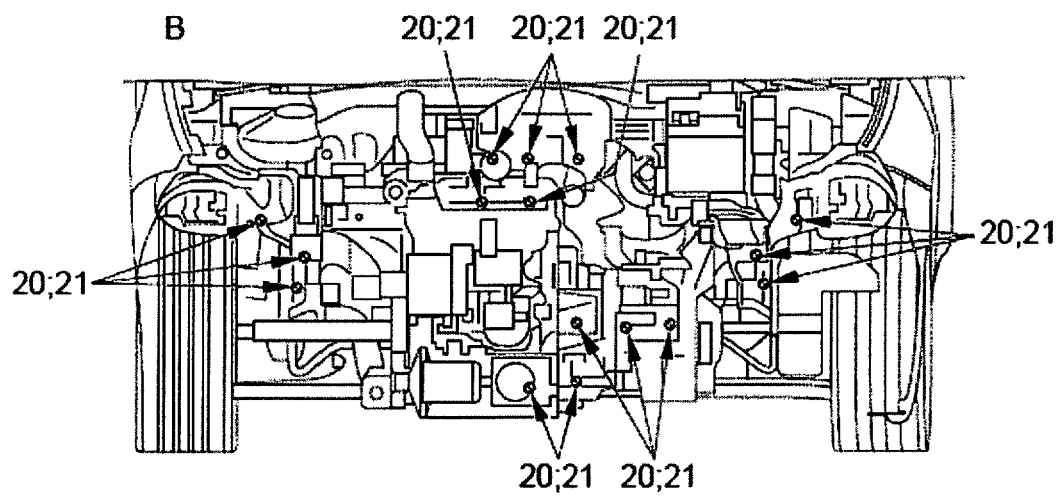

FIGS. 3a and 3b schematically depict a possible arrangement of acceleration sensors 21 or of sensor modules 20 for two different levels perpendicular to the x axis. It can easily be seen that the arranged acceleration sensors 21 have both different y coordinates and different z coordinates in the respective levels. The sensor modules 20 and the acceleration sensors 21 thereof are therefore installed in three dimensions in the front part 3 of the transportation vehicle 1 in the example depicted.

FIGS. 4a to 4d schematically depict isometric views of a transportation vehicle front part 3 having installed sensor modules 20, which comprise acceleration sensors, similarly to the arrangement shown in part in FIGS. 3a and 3b. The sensor modules 20 are in a form such that they integrate the acceleration signals of their acceleration sensor 21 over ascertainment periods to derive speed change values for their respective installation location therefrom. The ascertained speed change value is used to ascertain whether an effect above a previously defined effect threshold has taken place at the installation location of the sensor module 20. This can be carried out, for example, by virtue of the speed change being compared with an effect threshold value for the speed change. If this effect threshold value for the speed change is exceeded, then an effect is deemed to have occurred or taken place for the installation location of the applicable sensor module 20. Otherwise, no effect has taken place at the installation location. No effect has occurred.

Alternatively, a change in the speed change value above a stipulated change threshold can be used as a condition for establishing that there is an effect at the installation locations.

FIGS. 4a to 4d depict the sensor modules 20 at which an effect has been established to have occurred on the basis of the measured local acceleration signals by a solid circle (dark red and brown). Sensor modules installed at locations at which the acceleration measured values and the integration thereof have not yet yielded speed change values indicating that an effect has occurred at the applicable installation location are depicted by a non-solid circle (all colors apart from dark red and brown). On the basis of the timing sequence from FIGS. 4a to 4c, which depict the situation 5 ms (FIG. 4a), 15 ms (FIG. 4b) and 30 ms (FIG. 4c) after the beginning of a collision at 0° with a wall at a speed of 56 km/h by way of example, a spread of the "effect" can easily be detected. On the basis of the pattern evolving over time for when an effect is deemed to have occurred for a sensor module, it is possible to derive both a type of the effect event and a speed of the transportation vehicle 1 at the beginning of the effect event.

Figure 4A:
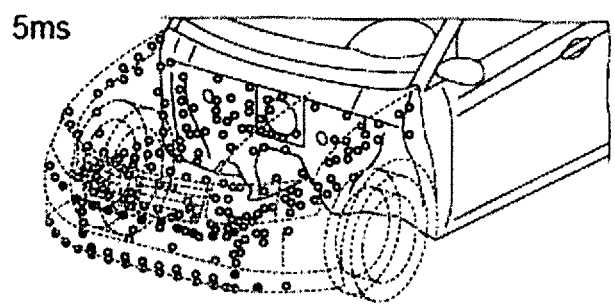
FIGS. 4a-4c show schematic depictions schematically depicting the effect information for sensor modules installed in a front part of a transportation vehicle during a front-on collision by the transportation vehicle and a prescribed speed for three different times, 5 ms, 15 ms and 30 ms, after the beginning of the collision.
Figure 4B:
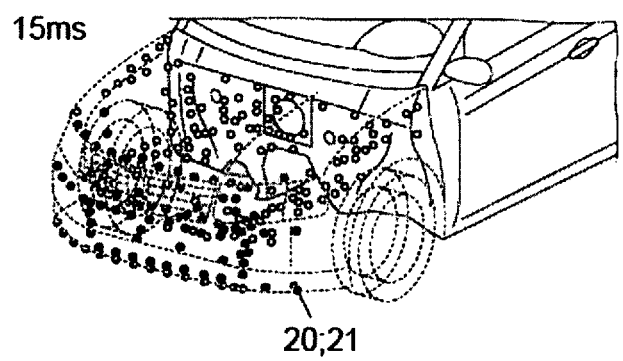
Figure 4C:
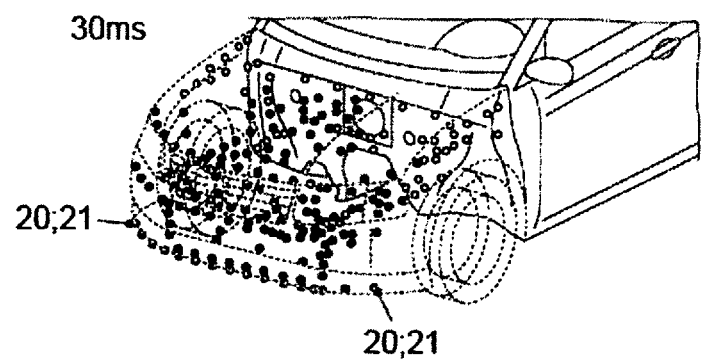
Figure 4D:
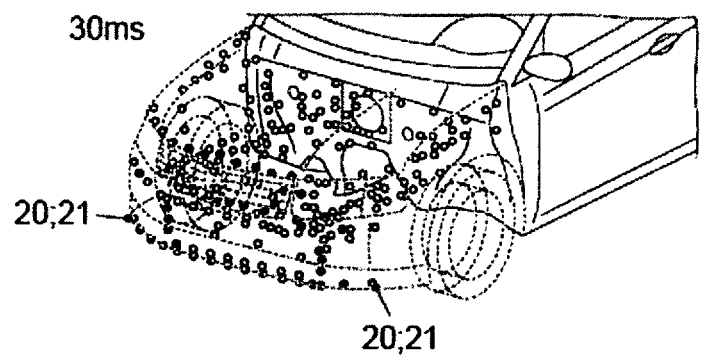
FIG. 4d shows a schematic depiction depicting the effect information for the front part of a transportation vehicle installed sensor modules during a front-on collision by the transportation vehicle and a speed to half the prescribed speed shown in FIG. 4c at the time 30 ms after the beginning of the collision.

For comparison, FIG. 4d depicts the situation after 30 ms for a collision with a wall at 0° at a speed of 27 km/h. It can be seen that the effect spreads more slowly in the front part 3 of the transportation vehicle 1.

Figure 5:
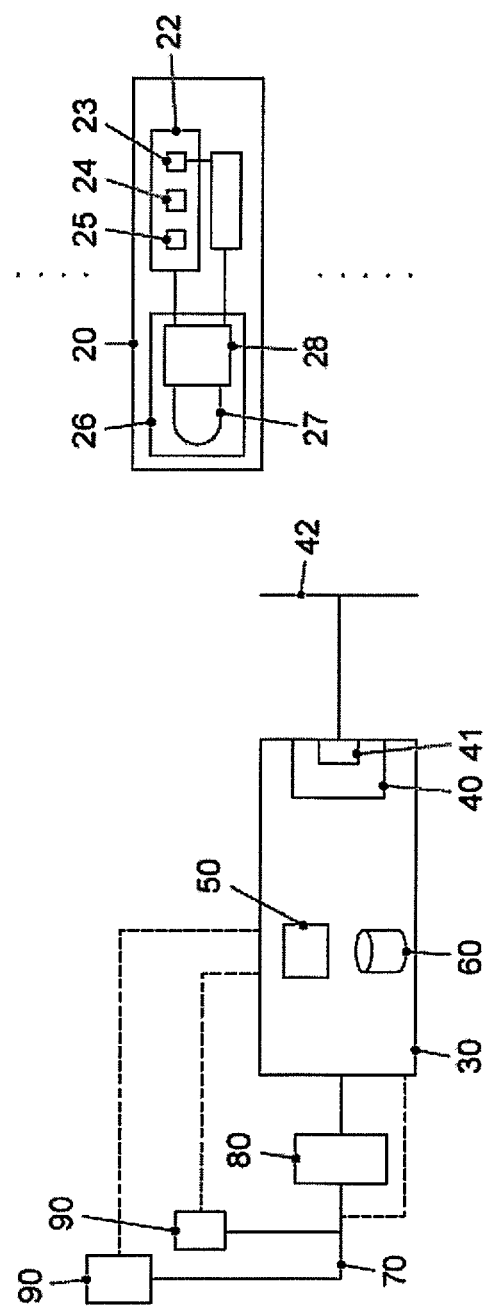
FIG. 5 shows a schematic depiction of the apparatus for early accident detection.

FIG. 5 schematically depicts an apparatus 10 for early accident detection. This is the same as the apparatus 10 depicted in FIG. 1. The apparatus 10 comprises a multiplicity of sensor modules 20, only one of which is depicted by way of example. Since the multiplicity of sensors and the recorded acceleration information cannot all be transmitted to an evaluation device at the same time without accepting a very high level of wiring complexity and without central processing of the individual acceleration signals causing a high level of computation complexity at the evaluation device, disclosed embodiments have provision for the sensor modules 20, which each comprise an acceleration sensor 21, also to comprise a processing device, such as a processing circuit 22. The processing device has an integrator 23 to derive a speed change from the values of the acceleration sensor. A comparator 24 is used to compare the ascertained speed change value or a quantity derived therefrom, for example, a difference between the speed change and the previously ascertained speed change, with a prescribed condition. In at least one disclosed embodiment, this can be a fixed value for the speed change that is to be exceeded. In another disclosed embodiment, the condition can be that the currently ascertained speed change is below a minimum absolute value of the previously ascertained speed change. This can also be viewed such that the condition is determined dynamically on the basis of the previously ascertained speed change.

The method just mentioned, in which the change in the ascertained speed change must exceed a prescribed value, provides a very reliable indicator of whether a local acceleration has occurred on the basis of an external effect on the respective subassembly on which the sensor module 20 is installed. The processing circuit 22 normally additionally comprises a sample and hold circuit 25, which stores the information content "effect occurring", which is normally represented by a binary memory value set to 1, until this effect information has been transmitted to the evaluation device 30. To this end, the sensor module 20 optionally has an RFID communication and power supply device 26. The RFID communication and power supply device 26 comprises an antenna 27 and also a communication and power supply circuit 28.

An RFID reader 41 is used to couple electromagnetic radiation into the antenna 27 of the sensor module 20, the radiation normally being rectified and smoothed by the communication and power supply circuit 28 to make it available to the processing circuit 22 and to the acceleration sensor 21. The communication and supply circuit 28 is furthermore designed to perform communication with the reader.

All elements of the sensor module 20 can be implemented in an integrated electronic circuit together. Besides the sensor module described, FIG. 5 also depicts the evaluation device 30 in more detail. The evaluation device optionally comprises the communication device 40, such as an RFID reader 41. This RFID reader 41 uses an antenna 42 to radiate a radio-frequency electromagnetic radiation into the front part 3 of the transportation vehicle 1. The arrangement of the antenna 42 is chosen in this case such that all installed sensor modules 20 that are supposed to be read wirelessly can receive the transmitted radio-frequency electromagnetic radiation by their respective antennas 27.

There can also be provision for two or more antennas 42 of the RFID reader 41 to be present to achieve secure communication with all sensor modules 20. It is likewise possible for the communication device 40 to comprise multiple RFID readers that each comprise at least one antenna.

Modulation of the radio-frequency electromagnetic radiation in the RFDI reader 41 can be used to transmit information to the individual sensor modules 20. The sensor modules can use a change in the reception circuit, for example, can use switching of a load in the reception circuit, to transmit information to the RFID reader.

In one transmission protocol, the sensor modules 20 can be addressed individually and the effect information of the sensor modules can be requested. In other disclosed embodiments of a transmission protocol, collision avoidance mechanisms that, for example, on the basis of unique identification numbers assigned to the sensor modules 20 or the communication and power supply devices 26 thereof are used to iteratively transmit the effect information from the sensor modules 20 to the evaluation device 30. The transmission of the individual effect information therefore occurs with staggered timing. Within a recording interval, the effect information of at least all sensor modules whose effect information has not already previously transmitted the information content "effect occurring" during the current effect event is recorded. Normally, the effect information of all sensor modules 20 is read or received during each recording interval.

The evaluation device 30 is designed to evaluate the received effect information together. This occurs because the effect information cannot be transmitted to the communication device 40 wirelessly at the same time, in each case after a recording period at evaluation time times. The information may be at equidistant intervals of time. The simplest evaluation occurs by virtue of the effect information or the values representing effect information of all acceleration sensors 21, i.e., all effect information that has been transmitted by the sensor modules 20, each being added to the total that was ascertained at a previous time during the same effect event. This is synonymous with the effect information being integrated over time. In this case, it is assumed each time that in an effect event the information content "effect occurring" is associated and remains associated with a sensor in each case as soon as ever it is established that there is an effect for this sensor according to the prescribed condition.

This total thus formed is referred to as an overall accident occurrence measure. If the overall accident occurrence measure reaches an intervention threshold value, then active triggering of a safety device for protecting occupants and for avoiding consequences of accident is regarded as necessary. For the different evaluation times after the beginning of the effect event, different intervention threshold values can be stipulated that are representable against time by a function. In some disclosed embodiments, however, there is a constant intervention threshold that is identical for all evaluation times.

To allow more accurate distinction between different accident events, one development has provision for, alternatively or additionally, a local accident occurrence measure also to be ascertained for each of the individual sensors or sensor modules 20. To this end, in a similar manner to the overall accident occurrence measure, the effect information is integrated or summed over time since the occurrence of the effect event, but separately for each of the individual acceleration sensors or sensor modules 20.

Figure 6A:
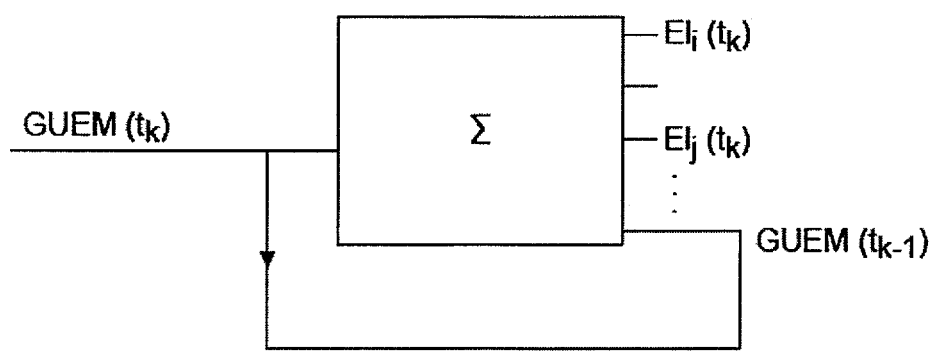
FIGS. 6a and 6b show schematic depictions to explain the ascertainment of an overall accident occurrence measure and a local accident occurrence measure.

FIG. 6a schematically depicts the formation of the overall accident occurrence measure GUEM in the formation of a local accident occurrence measure lUEM schematically. The effect information of the sensor or sensor module j at an evaluation time ti is indicated by: EIj(ti).

The overall accident occurrence measure GUEM(tk) at the evaluation time tk, on the assumption that the time difference between the times ti is constant, ti−ti−1=const., is given by:

$$GUEM(t_k) = \Sigma_j \Sigma_{t_i, t_1, \ldots t_k}^{(tk)} EI_j(t_i).$$

A similar situation applies for a local accident occurrence measure lUEMj(tk) of the sensor j at the evaluation time tk:

$$lUEM_j(t_k) = \Sigma_{t_i = t_1, \ldots t_k}^{(tk)} EI_j(t_i).$$

Figure 6B:
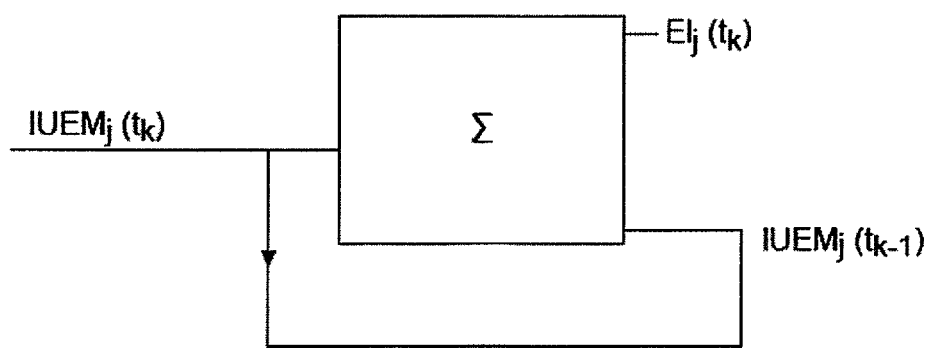

The calculation is depicted in FIG. 6b. The individual local accident occurrence measures can be considered to be variables representing the effect event at each of the different evaluation times. It has been found that a multivariate cluster analysis can be used to combine the accident events occurring during a simulation of different accident events, provided that these are represented by the local accident occurrence measures as variables, into clusters at each of the different evaluation times. In this case, the clusters are each only assigned accident events that are similar in terms of the intervention required. It therefore becomes possible to safely distinguish between effect events for which intervention is required and effect events for which no intervention is required after only a short period of time since the beginning of the effect event. At evaluation times that come later on, it is possible to also perform more detailed classifications for the previously formed clusters to obtain more accurate information about the current effect event by classification and association with the individual clusters through to association with individual event scenarios.

FIG. 7 schematically describes a course of an accident and an evaluation in simplified state by way of example for a selection of eight sensors. The columns of the chart represent different times within an accident. The left-hand column in this case contains the effect information at the earliest recorded time after the beginning of the effect event. The first eight rows represent eight acceleration sensors or sensor modules installed at different locations. A 1 indicates in each case the state that an effect that has occurred is detected at the relevant sensor module. For all times coming later on, regardless of whether or not it is again established that an effect has occurred at the applicable acceleration module on the basis of the recorded acceleration information, the effect information is set to the information content "effect occurring", which is represented by a (1) between parentheses. It can clearly be seen that the number of sensors whose effect information has assumed the value 1 ("effect occurring") increases over the course of time in the effect event. The ninth, contrasted row, then depicts the ascertained overall accident occurrence measure for the respective sampling time. In this regard, the effect information of the respective column is added to the overall accident occurrence measure of the column on the left, that is to say at the preceding evaluation time. Similarly, the last eight rows depict the local accident occurrence measures, with in each case only the effect information of the applicable cell in the associated row situated above that being added to the local accident occurrence measure at the previous sampling time in this case. The local accident occurrence measures at a particular sampling time are variables characterizing the effect event at the sampling time. They can be regarded more or less as an eight-value vector. This allows classification in comparison with effect events ascertained previously on the basis of experiments or simulations or clusters of effect events that have been ascertained in a multivariate cluster analysis. Ward's hierarchical agglomerate multivariate cluster analysis is suitable for this.

If more accurate information for accident characterization is desirable, then subgroups of sensors or sensor modules can also be evaluated in a similar manner in a similar manner, for example, all of the sensors installed in the left-hand side of the transportation vehicle, and all of the sensors installed in the right-hand side of the transportation vehicle, for example, to be able to reliably distinguish an effect occurring more on the right-hand side of the transportation vehicle, from an effect occurring more on the left-hand side of the transportation vehicle in a simple manner. Naturally, other groupings are possible to reliably and quickly record other information for detecting the accident event.

The evaluation device 30 (FIGS. 1 and 5) may be realized at least in part in a computer-aided circuit, but can also be realized in a hardwired circuit or by an FPGA. Optionally, the evaluation device therefore comprises a computer device 50 and a memory device 60 storing, inter alia, program code for execution on the computer device, the execution of the program code performing and controlling the described evaluation.

The accident information is output by the evaluation device 30, for example, to a transportation vehicle bus 70 or a control device 80 coupled to the transportation vehicle bus 70, which control device then triggers restraining methods and mechanisms 90, for example. If the evaluation device is coupled directly to the transportation vehicle bus 70 or to the restraining methods and mechanisms 90, the triggering can also be effected by the accident information of the evaluation device 30 directly.

The individual times for triggering restraining methods and mechanisms can be read from a memory device 60 and output as accident information to other systems of the transportation vehicle, for example, restraining methods and mechanisms, after a current effect event has been detected and/or classified or has been associated with an event cluster. The accident information can also comprise an identification of the detected effect event or the like.

Alternatively or additionally, the evaluation device can also comprise an artificial neural network that evaluates the effect information directly or the ascertained overall accident occurrence measures or local accident occurrence measures and classifies it/them in comparison with effect scenarios that have been taught to the artificial neural network. The artificial neural network can also be implemented with program code and the computer device 50 or alternatively in a standalone electronic circuit.

If an effect scenario that correctly describes the current effect event has been identified, a trigger time for restraining methods and mechanisms can be read, for example, from the memory device 60 and added to the accident information.

LIST OF REFERENCE SIGNS

1 Transportation vehicle
2 Coordinate system
3 (Transportation vehicle) front part
10 Apparatus 20 Sensor module
21 Acceleration sensor
22 Processing circuit
23 Integrator
24 Comparator
25 Sample-and-hold circuit
26 RFID communication and power supply device
27 Antenna
28 Communication and power supply circuit
30 Evaluation device
40 Communication device
41 RFID reader
42 Antenna
50 Computer device
60 Memory device
70 Transportation bus
80 Control device
90 Restraining methods or mechanisms

The invention claimed is:

1. A method for early detection of an accident, the method comprising:
recording local acceleration at distributed locations in a transportation vehicle using acceleration sensors installed at the distributed locations;
ascertaining local effect information for the distributed locations based on the measured local accelerations by integrating the measured local accelerations over ascertainment periods to ascertain speed change values for the respective distributed location and deriving the local effect information for the respective distributed location based on one or more speed change values obtained for the respective distributed location, wherein the local effect information for each distributed location is binary information representing applicable information content "effect occurring" and "no effect occurring" by values 1 and 0, or vice versa;
deriving accident information by jointly evaluating the local effect information for the distributed locations; and
outputting the accident information,
wherein the derivation of the accident information includes either:
iteratively ascertaining an overall accident occurrence measure at a plurality of evaluation times based on the local effect information for the distributed locations combined iteratively in recording intervals, wherein, for derivation of the accident information for a current effect event, the values of the local effect information over all past recording intervals are totaled, wherein, for each distributed location that has had local effect information that assumed the value "effect occurring" 1 in a recording interval for the current effect event, the local effect information for the respective distributed location for the recording interval and all subsequent recording intervals is assigned the value "effect occurring" 1, and wherein, in response to a determination, at an evaluation time of the plurality of evaluation times, that the overall accident occurrence measure exceeds or drops below an intervention threshold value, the output accident information includes intervention information; or
iteratively ascertaining a local accident occurrence measure at a plurality of evaluation times based on the local effect information for each of the distributed locations, wherein, for derivation of the accident information for a current effect event, the effect information for all previous recording intervals of the current effect event up to the respective evaluation time are totaled for the respective distributed location, wherein, for each distributed location that has had local effect information that assumed the value "effect occurring" 1 in a recording interval for the current effect event, the local effect information for the respective distributed location for the recording interval and all subsequent recording intervals is assigned the value "effect occurring" 1, wherein the local accident occurrence measures are variables that represent a current effect event, wherein the current effect event is associated with an effect scenario or with a cluster of effect scenarios using a classification operation, and wherein, in response to a determination, at an evaluation time of the plurality of evaluation times, that the current effect event represented by the local accident occurrence measures is associated with an effect scenario or cluster of effect scenarios requiring triggering of automatic intervention measures, the output accident information includes intervention information.

2. The method of claim 1, wherein multivariate cluster analysis is used to associate a current effect event represented by the overall accident occurrence measure, or represented by the local accident occurrence measures, with event scenarios.

3. The method of claim 1, wherein an artificial neural network trained in effect scenarios requiring intervention and effect scenarios requiring no intervention is used to associate a current effect event represented by the overall accident occurrence measure, or represented by the local accident occurrence measures, with event scenarios.

4. The method of claim 1, wherein the local effect information is read or requested wirelessly at least from some of the acceleration sensors located at the distributed locations.

5. The method of claim 1, wherein, during recording intervals, the local effect information of at least all acceleration sensors whose transmitted effect information had not already assumed the information content "effect occurring" in a preceding recording interval is requested iteratively.

6. An apparatus for early detection of an accident, the apparatus comprising:
a plurality of acceleration sensors installed at distributed locations in a transportation vehicle for recording local acceleration at the respective installation location;
one or more processing circuits for ascertaining in each case, local effect information for the distributed locations based on the respectively measured local acceleration by integrating the measured local accelerations over ascertainment periods to ascertain speed change values for the respective distributed location and deriving the local effect information for the respective distributed location based on one or more speed change values obtained for the respective distributed location, wherein the local effect information for each distributed location is binary information representing applicable information content "effect occurring" and "no effect occurring" by values 1 and 0, or vice versa; and
an evaluation device for deriving accident information by jointly evaluating the local effect information for the distributed locations and outputting the accident information,
wherein the derivation of the accident information includes either:

iteratively ascertaining an overall accident occurrence measure at a plurality of evaluation times based on the local effect information for the distributed locations combined iteratively in recording intervals, wherein, for derivation of the accident information for a current effect event, the values of the local effect information over all past recording intervals are totaled, wherein, for each distributed location that has had local effect information that assumed the value "effect occurring" 1 in a recording interval for the current effect event, the local effect information for the respective distributed location for the recording interval and all subsequent recording intervals is assigned the value "effect occurring" 1, and wherein, in response to a determination, at an evaluation time of the plurality of evaluation times, that the overall accident occurrence measure exceeds or drops below an intervention threshold value, the output accident information includes intervention information; or iteratively ascertaining a local accident occurrence measure at a plurality of evaluation times based on the local effect information for each of the distributed locations, wherein, for derivation of the accident information for a current effect event, the effect information for all previous recording intervals of the current effect event up to the respective evaluation time are totaled for the respective distributed location, wherein, for each distributed location that has had local effect information that assumed the value "effect occurring" 1 in a recording interval for the current effect event, the local effect information for the respective distributed location for the recording interval and all subsequent recording intervals is assigned the value "effect occurring" 1, wherein the local accident occurrence measures are variables that represent a current effect event, wherein the current effect event is associated with an effect scenario or with a cluster of effect scenarios using a classification operation, and wherein, in response to a determination, at an evaluation time of the plurality of evaluation times, that the current effect event represented by the local accident occurrence measures is associated with an effect scenario or cluster of effect scenarios requiring triggering of automatic intervention measures, the output accident information includes intervention information.

7. The apparatus of claim 6, wherein at least some of the plurality of acceleration sensors are wirelessly connected to the evaluation device.

8. The apparatus of claim 7, wherein the evaluation device comprises a communication device and, wherein, the acceleration sensors are incorporated in an RFID-capable sensor module that also includes one of the one or more, in each case with one of the multiple processing circuits and an RFID communication and power supply device.

9. The apparatus of claim 6, wherein, during recording intervals, the evaluation device iteratively requests the local effect information of at least all sensors whose transmitted effect information had not already assumed the information content "effect occurring" in a preceding recording interval.

10. The method of claim 2, wherein the local effect information is read or requested wirelessly at least from some of the acceleration sensors located at the distributed locations.

11. The method of claim 2, wherein, during recording intervals, the local effect information of at least all acceleration sensors whose transmitted effect information had not already assumed the information content "effect occurring" in a preceding recording interval is requested iteratively.

12. The apparatus of claim 6, wherein the local effect information is read or requested wirelessly at least from some of the acceleration sensors.

13. The apparatus of claim 6, wherein, during recording intervals, the local effect information of at least all acceleration sensors whose transmitted effect information had not already assumed the information content "effect occurring" in a preceding recording interval is requested iteratively.

14. The apparatus of claim 7, wherein, during recording intervals, the evaluation device iteratively requests the local effect information of at least all sensors whose transmitted effect information had not already assumed the information content "effect occurring" in a preceding recording interval.

15. The apparatus of claim 7, wherein the local effect information is read or requested wirelessly at least from some of the acceleration sensors.

16. The apparatus of claim 7, wherein, during recording intervals, the local effect information of at least all acceleration sensors whose transmitted effect information had not already assumed the information content "effect occurring" in a preceding recording interval is requested iteratively.

* * * * *